(12) United States Patent
Rolfe et al.

(10) Patent No.: US 7,750,062 B2
(45) Date of Patent: Jul. 6, 2010

(54) METHOD OF PRODUCING A POLYMERIC MATERIAL, POLYMER, MONOMERIC COMPOUND AND METHOD OF PREPARING A MONOMERIC COMPOUND

(75) Inventors: James Rolfe, Gloucestershire (GB); Warrick Allen, Worcester (GB)

(73) Assignee: Novel Polymer Solutions Limited, Malvern (GB)

( * ) Notice: Subject to any disclaimer, the term of this patent is extended or adjusted under 35 U.S.C. 154(b) by 0 days.

(21) Appl. No.: 12/342,282

(22) Filed: Dec. 23, 2008

(65) Prior Publication Data

US 2009/0156706 A1 Jun. 18, 2009

Related U.S. Application Data

(63) Continuation of application No. PCT/GB2007/000243, filed on Jun. 28, 2007.

(30) Foreign Application Priority Data

Jun. 30, 2006 (GB) .................................. 0613013.2

(51) Int. Cl.
| | |
|---|---|
| C08F 2/46 | (2006.01) |
| C08F 2/50 | (2006.01) |
| C08G 73/00 | (2006.01) |
| C07C 233/00 | (2006.01) |

(52) U.S. Cl. .................. 522/173; 522/153; 522/151; 526/303.1; 526/307.1; 564/123; 564/133; 564/142; 564/143; 528/367; 528/368

(58) Field of Classification Search ................ 522/173, 522/174; 526/303.1, 307.1; 564/123, 133, 564/142, 143; 528/367, 368
See application file for complete search history.

(56) References Cited

U.S. PATENT DOCUMENTS

| | | | | |
|---|---|---|---|---|
| 5,475,119 | A | * | 12/1995 | Baur et al. ................... 548/570 |
| 5,563,016 | A | * | 10/1996 | Baur et al. ................ 430/108.2 |
| 6,559,261 | B1 | * | 5/2003 | Milne et al. ................... 526/312 |
| 6,703,467 | B1 | * | 3/2004 | Milne et al. .............. 526/303.1 |
| 7,112,639 | B2 | * | 9/2006 | Hall .......................... 526/218.1 |

FOREIGN PATENT DOCUMENTS

| | | |
|---|---|---|
| DE | 2146511 | 3/1972 |
| EP | 0548826 | 6/1993 |
| WO | WO 00/06610 | 2/2000 |
| WO | WO 00/06658 | 2/2000 |
| WO | WO 2007012860 A1 * | 2/2007 |
| WO | WO 2007031781 A1 * | 3/2007 |

OTHER PUBLICATIONS

International Search Report International Publication No. WO 2008/001102.

* cited by examiner

*Primary Examiner*—Sanza L McClendon
(74) *Attorney, Agent, or Firm*—King & Schickli, PLLC

(57) ABSTRACT

A method of producing a polymeric material including subjecting a starting material to conditions under which polymerisation occurs. The starting material includes a group of sub-formula (XIII)

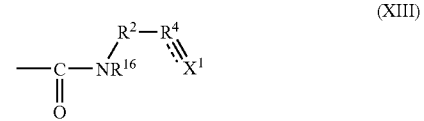

Figure 1:
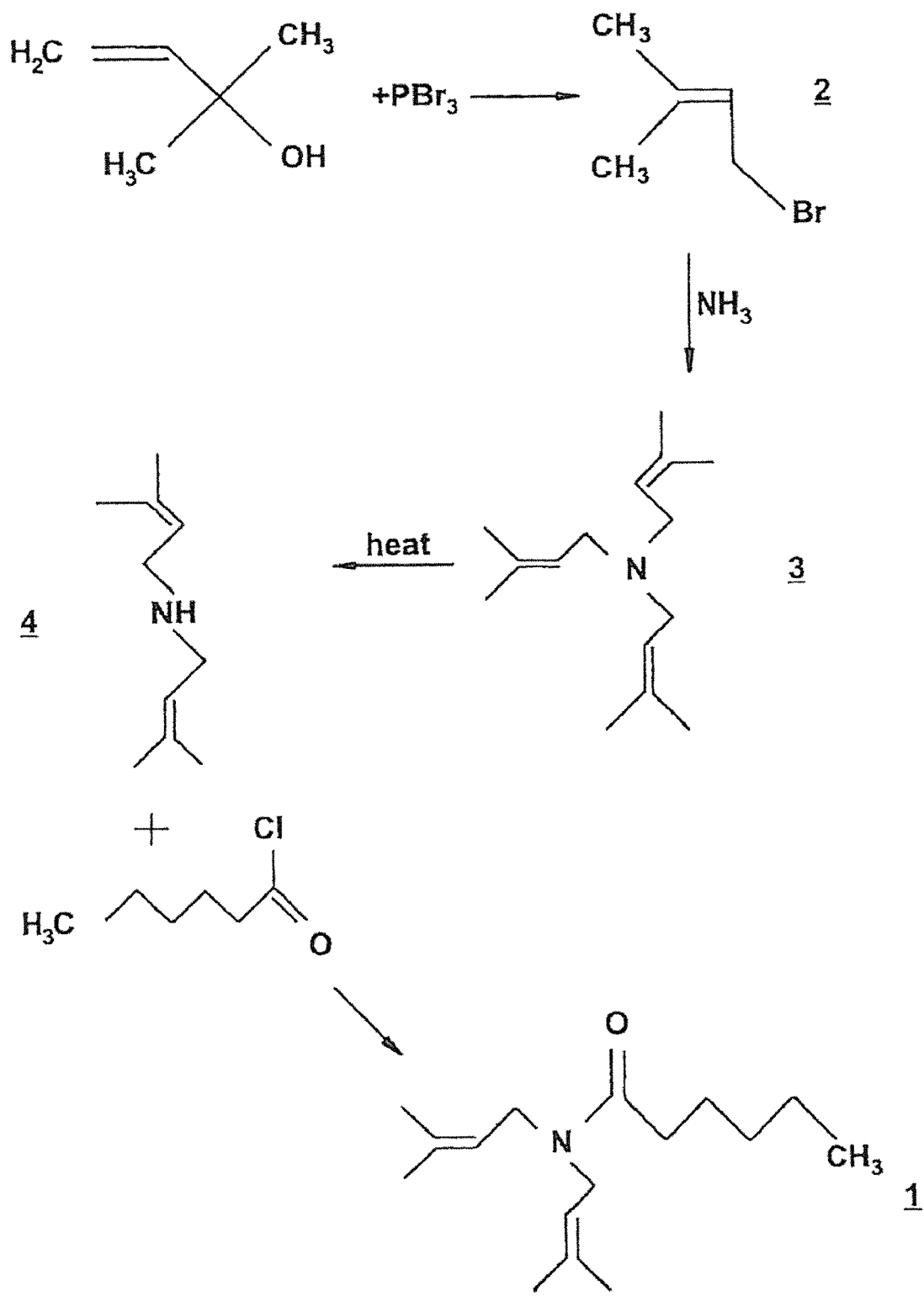

where $R^{16}$ is selected from hydrogen, halo, nitro, hydrocarbyl, optionally substituted or interposed with functional groups, or

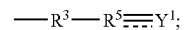

$R^2$ and $R^3$ are independently selected from $(CR^6R^7)_n$ or a group $CR^8R^9$, $CR^6R^7CR^8R^9$ or $CR^8R^9CR^6R^7$ where n is 0, 1 or 2 and $R^6$ and $R^7$ are independently selected from hydrogen or alkyl, and either one of $R^8$ or $R^9$ is hydrogen and the other is an electron withdrawing group, or $R^8$ or $R^9$ together form an electron withdrawing group. $R^4$ and $R^5$ are independently selected from CH or $CR^{1\circ}$ where $CR^{1\circ}$ is an electron withdrawing group, $X^1$ is a group $CX^2X^3$, $Y^1$ is a group $CY^2Y^3$, and $X^2X^3$, and, if present, $Y^2$ and $Y^3$, are each a $C_1$ to $C_4$ alkyl group.

26 Claims, 2 Drawing Sheets

METHOD OF PRODUCING A POLYMERIC MATERIAL, POLYMER, MONOMERIC COMPOUND AND METHOD OF PREPARING A MONOMERIC COMPOUND

This application is a continuation of PCT/GB2007/00243 filed Jun. 28, 2007 the subject matter of which is incorporated herein by reference.

FIELD OF THE INVENTION

This invention relates to polymeric materials, methods of manufacturing said polymeric materials, and associated monomers.

BACKGROUND OF THE INVENTION

International Publications WO 00/06610, WO 00/06533, WO 00/06658, WO 01/36510, WO 01/40874 and WO 01/74919, the contents of all of which are herein incorporated by reference, discloses a class of polymers obtained from the polymerisation of a number of compounds which possess one or more dienyl end groups. The polymers possess or promise a variety of useful and exciting properties, such as ease of polymerisation, and the ability to "tailor" the properties of the polymer by variation of the "core" group that the end group(s) is attached to. However, the present inventors have found that difficulties can be experienced in polymerising some monomers of the type taught in WO 00/06610. Accordingly, the present inventors have devised improved polymeric systems which, in at least some of their embodiments, enable facile polymerisation to take place and provide polymeric materials exhibiting advantageous and improved properties.

SUMMARY OF THE INVENTION

According to a first aspect of the invention there is provided a method of producing a polymeric material, said method including the step of subjecting a starting material which includes a group of sub-formula (I)

(I)

where $R^1$ is $CR^aR^b$, where $R^a$ is hydrogen or alkyl and $R^b$ is hydrogen, alkyl or

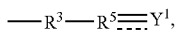

or $R^1$ is an electron withdrawing group, $R^2$ and $R^3$ are independently selected from $(CR^6R^7)_n$ or a group $CR^8R^9$, $CR^6R^7CR^8R^9$ or $CR^8R^9CR^6R^7$ where n is 0, 1 or 2, $R^6$ and $R^7$ are independently selected from hydrogen or alkyl, and either one of $R^8$ or $R^9$ is hydrogen and the other is an electron withdrawing group, or $R^8$ or $R^9$ together form an electron withdrawing group; and $R^4$ and $R^5$ are independently selected from CH or $CR^{10}$ where $CR^{10}$ is an electron withdrawing group, the dotted lines indicate the presence or absence of a bond, $X^1$ is a group $CX^2X^3$) where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and at least one of, and preferably all of, $X^2, X^3, Y^2$ and $Y^3$ are substituents other than hydrogen and fluorine;

to conditions under which polymerisation of the starting material occurs, with the proviso that if $R^1$ is a group $N^+HR^{16}(Z^{m-})_{1/m}$, where $R^{16}$ is selected from hydrogen, hydrocarbyl or

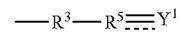

only, and Z is an anion of charge m; then either (i) the polymerisation is a homopolymerisation or a copolymerisation in which the anion Z does not form a repeat unit in a resulting polymeric chain, or (ii) the starting material only includes one group of formula

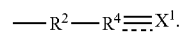

For the avoidance of doubt, a resulting polymeric chain can be any polymeric chain comprising repeat units, and a polymer may comprise one or more polymeric chains, Which may be cross-linked.

The present inventors have recognised that certain difficulties can be encountered in polymerising some of the species disclosed in WO 00/066110. Furthermore, the present inventors have recognised that the difficulties can be due to certain side reactions which can occur in competition with the desired diene polymerisation reaction. In particular, the present inventors have recognised that in diene polymerisation schemes of the type disclosed in WO 00/06610, the diene groups need to be activated in order to make them susceptible to radical polymerisation. This activation is manifest by a reduction in electron density in the carbon-carbon double bonds caused by the presence of electron withdrawing groups near or actually adjacent to the diene groups. However, when dienes are activated in this way, another reaction mechanism can occur which involves hydrogen atoms attached to the carbon atoms adjacent to the diene bonds. These hydrogen atoms are so called allylic hydrogens, and can take part in unwanted dimerisation reactions. Monomers which less strongly electron withdrawing with respect to the carbon-carbon double bonds, such as dienyl amides, are especially susceptible to unwanted allylic hydrogen reactions occurring. Very surprisingly, the present inventors have found that the desired polymerisation reaction can be favoured by varying the nature of the substituents attached to the terminal carbon atoms of the dienyl group. In particular, it has been found that the use of substituents in these positions which are not taught by WO 00/00610 can provide improved polymerisation. Without wishing to be bound by any particular theory, it is believed that radical intermediates associated with the desired polymerisation reaction may be stabilised by the terminal carbon substituents, and/or radical intermediates, associated with the unwanted allylic side reaction may be destabilised by the terminal carbon substituents.

Polymers of the invention can be easily and conveniently polymerised, in at least some instances without the presence of an initiator, adhere very effectively to substrates, and act as a substrate itself upon which other substances can be deposited and adhered.

Generally, at least one of, and preferably all of, $X^2, X^3, Y^2$ (when present) and $Y^3$ (when present) is a group or atom which can stabilise desired free radical intermediates and/or destabilise unwanted free radical intermediates.

Preferably at least one, and most preferably all, of $X^2$, $X^3$, $Y^2$ and $Y^3$ is an optionally substituted hydrocarbyl group. Very preferably at least one, and most preferably all, of $X^2$, $X^3$, $Y^2$ and $Y^3$ is an optionally substituted alkyl group. Particularly preferred examples are $C_1$ to $C_4$ alkyl groups; especially methyl or ethyl. Very surprisingly, it has been found that embodiments in which $X^2$, $X^3$, $Y^2$ and/or $Y^3$ are alkyl groups are able to polymerise on exposure to radiation without the presence of an initiator. Alternatively, at least one, and preferably all, of $X^2$, $X^3$, $Y^2$ and $Y^3$ are aryl and/or heterocyclic, such as pyridyl, pyrimidinyl, or a pyridine or pyrimidine containing group.

In one important range of embodiment, the group of the sub-formula (I) includes the group

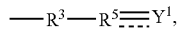

the polymerisation is a cyclopolymerisation reaction, and at least one of (a) $R^1$ or (b) $R^2$ and $R^3$ or (a) $R^4$ and $R^5$ includes an electron withdrawing group which is able to activate a cyclopolymerisation reaction.

Conditions under which polymerisation occurs may comprise the application of radiation, such as UV radiation, where necessary in the presence of a photoinitiator (but preferably without an initiator present), the application of heat (which may be in form of IR radiation), where necessary in the presence of an initiator, by the application of other sorts of initiator such as chemical initiators, or by initiation using an electron beam. The expression "chemical initiator" as used herein refers to compounds which can initiate polymerisation such as free radical initiators and ion initiators such as cationic or anionic initiators as are understood in the art. Radiation or electron beam induced polymerisation is suitably effected in the substantial absence of a solvent. As used herein, the expression "in the substantial absence of solvent" means that there is either no solvent present or there is insufficient solvent present to completely dissolve the reagents, although a small amount of a diluent may be present to allow the reagents to flow.

Preferably, the starting materials polymerise under the influence of ultraviolet radiation or both. Polymerisation may take place either spontaneously or in the presence of a suitable initiator. Examples of suitable initiators include 2,2'-azobisisobutyronitrile (AIBN), aromatic ketones such as benzophenones in particular acetophenone; chlorinated acetophenones such as di- or tri-chloracetophenone; dialkoxyacetophenones such as dimethoxyacetophenones (sold under the trade name IRGACURE 651) dialkylhydroxyacetophenones such as dimethylhydroxyacetophenone (sold under the trade name DAROCUR 1173); substituted dialkylhydroxyacetophenone alkyl ethers such compounds of formula

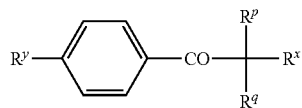

where $R^y$ is alkyl and in particular 2,2-dimethylethyl, $R^x$ is hydroxyl or halogen such as chloro, and $R^p$ and $R^q$ are independently selected from alkyl or halogen such as chloro (examples of which are sold under the trade names DAROCUR 1116 and TRIGONAL P1); 1-benzoylcyclohexanol-2 (sold under the trade name IRGACURE 184); benzoin or derivatives such as benzoin acetate, benzoin alkyl ethers in particular benzoin butyl ether, dialkoxybenzoins such as dimethoxybenzoin or deoxybenzoin; dibenzyl ketone; acyloxime esters such as methyl or ethyl esters of acyloxime (sold under the trade name QUANTAQURE PDO); acylphosphine oxides, acylphosphonates such as dialkylacylphosphonate, ketosulphides for example of formula

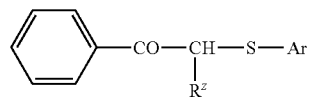

where $R^z$ is alkyl and Ar is an aryl group; dibenzoyl disulphides such as 4,4'-dialkylbenzoyldisuphide; diphenyldithiocarbonate; benzophenone; 4,4'-bis(N,N-dialkyamino)benzophenone; fluorenone; thioxanthone; benzil; or a compound of formula

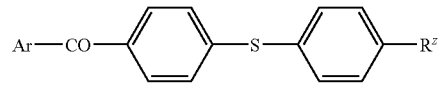

where Ar is an aryl group such as phenyl and $R^z$ is alkyl such as methyl (sold under the trade name SPEEDCURE BMDS).

As used herein, the term "alkyl" refers to straight or branched chain alkyl groups, suitably containing up to 20 and preferably up to 6 carbon atoms. The term "alkenyl" and "alkynyl" refer to unsaturated straight or branched chains which include for example from 2-20 carbon atoms, preferably from 2 to 6 carbon atoms. Chains may include one or more double to triple bonds respectively. In addition, the term "aryl" refers to aromatic groups such as phenyl or naphthyl.

The term "hydrocarbyl" refers to any structure comprising carbon and hydrogen atoms. For example, these may be alkyl, alkenyl, alkynyl, aryl such as phenyl or napthyl, arylalkyl, cycloalkyl, cycloalkenyl or cycloalkynyl. Suitably they will contain up to 20 and preferably up to 10 carbon atoms. The term "heterocyclic" includes aromatic or non-aromatic rings, for example containing from 4 to 20, suitably from 5 to 10 ring atoms, at least one of which is a heteroatom such as oxygen, sulphur or nitrogen. Examples of such groups include furyl, thienyl, pyrrolyl, pyrrolidinyl, imidazolyl, triazolyl, thiazolyl, tetrazolyl, oxazolyl, isoxazolyl, pyrazolyl, pyridyl, pyrimidinyl, pyrazinyl, pyridazinyl, triazinyl, quinolinyl, isoquinolinyl, quinoxalinyl, benzthiazolyl, benzoxazolyl, benzothienyl or benzofuryl.

The term "functional group" refers to reactive groups such as halo, cyano, nitro, oxo, $C(O)_n R^e$, $OR^e$, $S(O)_t R^e$, $NR^f R^g$, $OC(O)NR^f R^g$, $C(O)NR^f R^g$, $OC(O)NR^f R^g$, $-NR^7 C(O)_n R^6$, $-NR^e CONR^f R^g$, $-C=NOR^e$, $-N=CR^f R^g$, $S(O)_t NR^f R^g$, $C(S)_n R^e$, $C(S)OR^e$, $C(S)NR^f R^g$ or $-NR^f S(O)_t R^e$ where $R^e$, $R^f$ and $R^g$ are independently selected from hydrogen or optionally substituted hydrocarbyl, or $R^f$ and $R^g$ together form an optionally substituted ring which optionally contains further heteroatoms such as $S(O)_s$, oxygen and nitrogen, n is an integer of 1 or 2, t is 0 or an integer of 1-3. In particular the functional groups are groups such as halo, cyano, nitro, oxo, $C(O)_n R^e$, $OR^e$, $S(O)_t R^e$, $NR^f R^g$, $OC(O)NR^f R^g$, $C(O)NR^f R^g$, $OC(O)NR^fR^g$, $-NR^7C(O)_nR^6$, $-NR^eCONR^fR^g$, $-NR^eC-SNR^fR^g$, $C=NOR^e$, $-N=CR^fR^g$, $S(O)_tNR^fR^g$, or $-NR^fS(O)_tR^e$ where $R^e$, $R^f$ and $R^g$, n and t are as defined above.

The term "heteroatom" as used herein refers to non-carbon atoms such as oxygen, nitrogen or sulphur atoms. Where the nitrogen atoms are present, they will generally be present as pad of an amino residue so that they will be substituted for example by hydrogen or alkyl.

The term "amide" is generally understood to refer to a group of formula $C(O)NR^eR^f$ where $R^e$ and $R^f$ are hydrogen or an optionally substituted hydrocarbyl group. Similarly, the term "sulphonamide" will refer to a group of formula $S(O)_2NR^eR^f$.

The nature of any electron withdrawing group or groups additional to the amide moiety used in any particular case will depend upon its position in relation to the double bond it is required to activate, as well as the nature of any other functional groups within the compound. The term "electron withdrawing group" includes within its scope atomic substituents such as halo, e.g. fluoro, chloro and bromo.

Where $R^{10}$ is an electron withdrawing group, it is suitably acyl such as acetyl, nitrile or nitro.

Suitable groups $R^a$ include hydrogen or methyl, in particular hydrogen.

Preferably, either i) $R^1$ is a group $N^+R^{12}R^{16}(Z^{m-})_{1/m}$, $S(O)_pR^{13}R^{16}$, $BR^{16}$, $P(O)_qR^{14}R^{16}$ or $Si(R^{15}R^{16})$ where $R^{12}$ is hydrogen, halo, nitro or hydrocarbyl, optionally substituted or interposed with functional groups; $R^{13}$, $R^{14}$, and $R^{15}$ are independently selected from hydrogen or hydrocarbyl; $R^{16}$ is selected from hydrogen, halo, nitro, hydrocarbyl, optionally substituted or interposed with functional groups, or

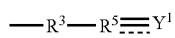

where $R^3$, $R^5$ and $Y^1$ are as defined previously; Z is an anion of charge m; p is 0, 1, or 2; and q is 1 or 2; or ii) $R^1$ is $C(O)NR^{16}-$, $S(O)_2NR^{16}-$, $C(O)ONR^{16}-$, $CH_2ONR^{16}-$, or $CH=CHR^cNR^{16}-$ where $R^c$ is an electron withdrawing group or iii) $R^1$ is $OC(O)CHR^{16}-$, $C(O)CHR^{16}-$ or $S(O)_2CHR^{16}-$.

When $R^1$ is $N^+R^{12}R^{16}(Z^{m-})_{1/m}$, Z may be a halide ion, a boride ion, or a carboxylic acid ester.

When $R^1$ is $CH=CHR^dNR^{16}13$, $R^d$ may be a carbonyl group or phenyl substituted at the ortho and/or para positions by an electron withdrawing substituent such as nitro.

In the group of sub-formula (1), $X^1$ and, where present, $Y^1$ preferably represents $CX^2X^3$ and $CY^2Y^3$ respectively, and the dotted bonds are absent.

A preferred group of the compounds for use in the method of the invention is a compound of structure (II)

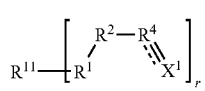

(II)

and in particular a compound of formula (IIA)

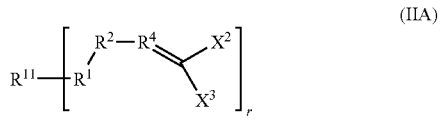

(IIA)

where $X^1$, $X^2$, $X^3$, $R^1$, $R^2$, $R^4$, and the dotted bonds are as defined in relation to formula (I) above, r is an integer of 1 or more, and $R^{11}$ is a bridging group, an optionally substituted hydrocarbyl group, a perhaloalkyl group, a siloxane group or an amide, of valency r.

Where in the compound of formula (II) and (IIA) r is 1, compounds can be readily polymerised to form a variety of polymer types depending upon the nature of the group $R^{11}$. Examples of groups which are commonly found in polymer technology are included below in Table 1.

Monomers of this type may be represented as structure (III)

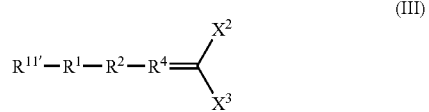

(III)

where the group

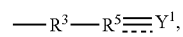

if present, is of the form

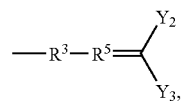

and where $X^2$, $X^3$, $Y^2$, $Y^3$, $R^1$, $R^2$, $R^3$, $R^4$ and $R^5$, are as previously defined, and $R^{11'}$ is an optionally substituted hydrocarbyl group, a perhaloalkyl group, a siloxane group or an amide.

In particular, $R^{11}$ or $R^{11'}$ may be an optionally substituted alkyl, alkenyl, alkynyl or aryl group, wherein the optional substituents may be selected from halogen, hydroxyl, carboxy or salts thereof or acyloxy.

In structures of compounds (II), (IIA), (III) and (IV), $R^{11}$ or $R^{11'}$ may comprise a straight or branched chain hydrocarbyl group, optionally substituted or interposed with functional groups.

Preferably, $R^{11}$ or $R^{11'}$ is an optionally substituted hydrocarbyl group having four or more carbon atoms. $R^{11}$ or $R^{11'}$ may be a straight or branched chain alkyl group having four or more carbon atoms.

A preferred class of compounds of formula (III) are those of formula (IV)

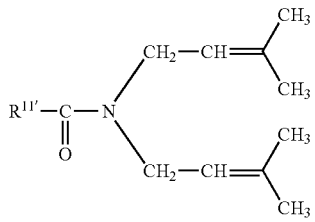

where $R^{11'}$ is as defined above.

The compound of formula (IV) may be of a compound of formula (V)

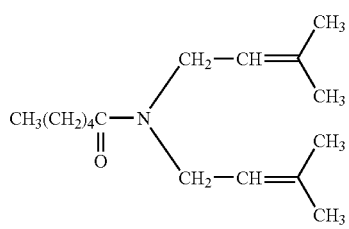

Alternatively, $R^{11}$ or $R^{11'}$ may comprise a perhaloalkyl group, for example of from 1 to 3 carbon atoms such as a perhalomethyl group, in particular perfluoromethyl.

The invention may also be applied to other sorts of polymers; for example, where in the compounds of formula (II), r is greater than one polymerisation can result in polymer network. Particular examples are compounds of formula (II) as defined above, where $R^{11}$ is a bridging group and r is an integer of 2 or more, for example from 2 to 8 and preferably from 2-4.

On polymerisation of these such compounds, networks are formed whose properties maybe selected depending upon the precise nature of the $R^{11}$ group, the amount of chain terminator present and the polymerisation conditions employed.

Examples of suitable bridging groups include those found in polyethylenes, polypropylenes, nylons, as listed in Table 1. Further examples of bridging groups can be found in WO 00/06610.

TABLE 1

| Polymer Type | Repeat Unit of Bridging Group |
| --- | --- |
| Polyethylene | $CH_2$ |
| Polystyrene | $CH_2CH(C_6H_5)$ where the phenyl ring is optionally substituted |
| Polyisobutylene | $CH_2CH(CH(CH_3)_2)$ |
| Polyisoprene | $CH_2CH(CH_3)$ |
| Polytetrafluoroethylene | $CH_2(CF_2)_xCH_2$ |
| Polyvinylidenefluoride | $CH_2(CF_2CH_2)_x$ |
| Polyethyleneoxide | $(OCH_2CH(CH_3))_xO$ |
| Nylon | $CH_2(NHCOCH_2)_xCH_2$ |
| Peptide | $CH_2(NHCOCH_R)_xCH_2$ |
| Polyurethanes | —NH—CO—O— |
| Polyesters | —RC(O)OR'— where R and R' are organic groups such as hydrocarbyl |

TABLE 1-continued

| Polymer Type | Repeat Unit of Bridging Group |
| --- | --- |
| Polysiloxanes | e.g. —$SiO_2$—, —$R_2SiO$— or —$R_2Si_2O_3$— where R is an organic group such as hydrocarbyl |
| Polyacrylates | —$CH_2C(COOH)H$— |
| Polyureas | —NHCONH— |
| Polythioureas | —NH—C(S)—NH— |

The polymerisaton of the starting material may produce a homopolymer. However, the invention includes the possibility of producing copolymers where another monomeric compound, for example one which is not of formula (I), is mixed with the compound of formula (I) prior to polymerisation. Such monomers are known in the art.

In a range of embodiments, the starting material does not include the group

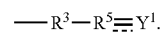

In a preferred example within this range of embodiments, the compound of formula (III) is a compound of formula (VI)

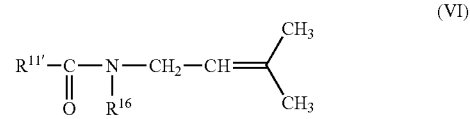

where $R^{16}$ is selected from hydrogen, halo, nitro, or hydrocarbyl, optionally substituted or interposed with functional groups, only. The compound of formula (VI) may be a compound of formula (VII)

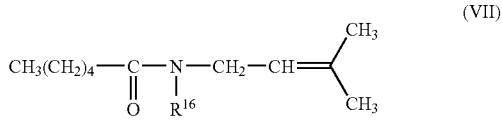

In a copolymerisation scheme, a starting material which does not include the group

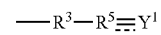

is reacted with a compound of formula VIII

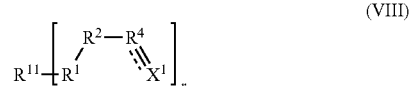

where $R^1$, $R^2$, $R^4$, $R^{11}$ and $X^1$ are as defined in relation to sub-formula (I). Preferably, in formula VIII, r is 2.

The compound of formula (VIII) may be a compound of formula (IX)

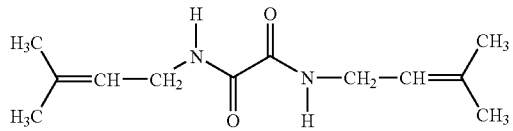

(IX)

Composites may also be produced by polymerising compounds of formula (I) in the presence of other moieties such as graphite, ethers such as crown ethers or thioethers, phthalocyanines, bipyridyls or liquid crystal compounds, all of which will produce composite polymers with modified properties.

Using the method of the invention, it is possible to take a suitable organic system that has optimal or optimised properties for use in certain applications, e.g. high yield strength, large hyperpolarisability, high pyroelectric coefficient, high conductivity etc; and to structurally modify the system, so that it is possible to polymerise it. If functional groups are incorporated that will polymerise, it will become possible to create a three dimensional network or plastic that will have properties associated with the parent organic system.

The advantages of the compounds of the invention is that they allow for the possibility that they can be applied in the form of a paint and caused to polymerise in situ. This allows for ease of processing. Further, by providing for the construction of networks as a result of the cross linking, the resultant polymer can be mechanically strong and durable.

The starting material may be applied to a substrate prior to polymerisation and the polymerisation results in the production of a coating on the substrate.

According to a second aspect of the invention there is provided a polymer obtained by a method in accordance with the first aspect of the invention.

The polymer may be of sub-formula (X)

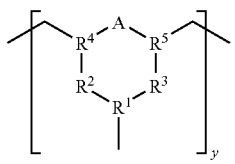

(X)

where A is a bond or $CY^2Y^3$, $R^1$, $R^2$, $R^3$, $R^4$, $R^5$, $CX^2X^3$ and $CY^2Y^3$ are as defined in relation to sub-formula (I), and y is an integer in excess of 1, preferably in excess of 5.

According to a third aspect of the invention there is provided a monomeric compound which includes a group of sub-formula (I) as defined in the first aspect of the invention. The monomer may include any group or consist of any compound described in accordance with the first aspect of the invention.

According to a fourth aspect of the invention there is provided a method of preparing a monomeric compound in accordance with the third aspect of the invention including the step of reacting a compound having a group of sub-formula (XI)

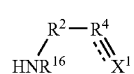

(XI)

with a compound having a group of sub-formula (XII)

(XII)

where $X^1$, $Y^1$, $R^1$, $R^2$, $R^3$, $R^4$, $R^5$ and $R^6$ are as defined in the first aspect of the invention, and LG is a leaving group.

LG may be a halogen, with chloro being particularly preferred. Alternatively, LG may be mesylate, silyl or tosylate. The reaction may be effected in an organic solvent, such as acetone. Compounds of formulae (XI) and (XII) are either known compounds or can be prepared by conventional methods.

BRIEF DESCRIPTION OF THE DRAWING FIGURES

Figure 2:
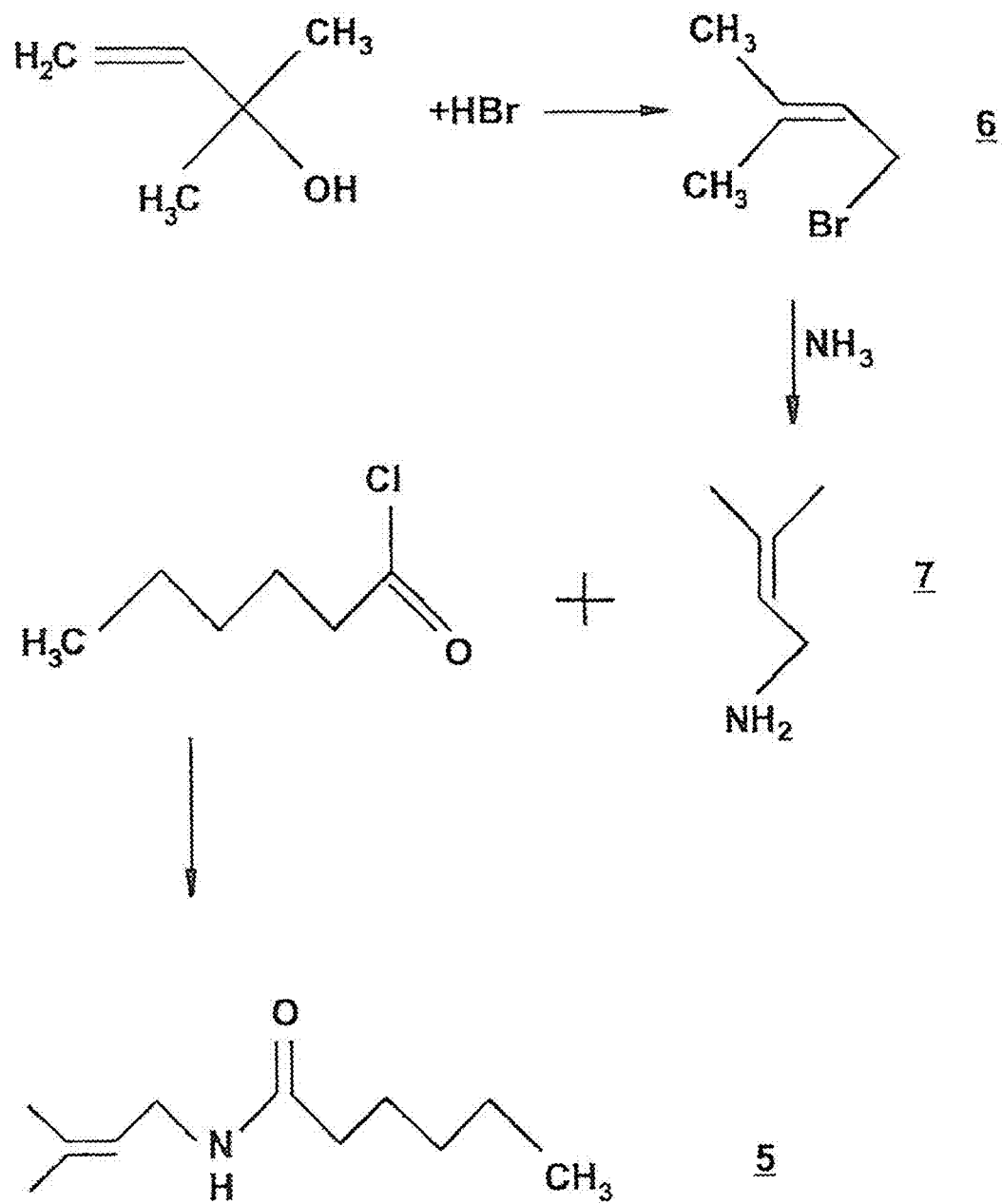

Embodiments of monomers, polymers, and methods for preparing same will now be described with reference to the accompanying drawings, in which:
FIG. 1 shows a first reaction scheme; and
FIG. 2 shows a second reaction scheme.

DETAILED DESCRIPTION OF THE INVENTION

EXAMPLE 1

The target molecule 1 (hexanoic acid (bis(3-methylbut-2-enyl)amide) is shown below

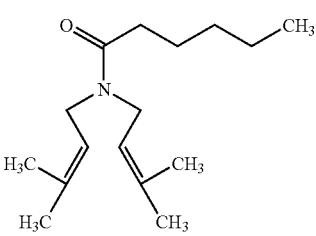

1 and the synthetic scheme is shown in FIG. 1.

The synthesis of monomer 1 is described below. Reactions 1.1, 1.2, 1.3 and 1.4 were carried out under an atmosphere of argon using pre-dried solvents; t-butyl methyl ether was dried over $CaSO_4$ overnight, passed through alumina and fractionally distilled, pyridine was dried over Linde type 4A molecular sieves followed by distillation, tetrahydrofuran (THF) was refluxed over sodium-benzophenone mixture before collection.

Column chromatography was carried out using flash grade silica.

1.1 Synthesis of 1-bromo-3-methylbut-2-ene(2)

t-Butyl methyl ether (1000 ml) and 3-methylbuten-3-ol (230 g, 280 ml, 2.67 moles) were charged into a multi neck flung flask (3 L) fitted with a mechanical stirrer, condenser, thermometer and a dropping funnel. Pyridine (21 g, 22 ml, 0.267 moles) was added and the contents of the flask were stirred at room temperature for 30 minutes after which time $PBr_3$ (361 g, 125 ml, 1.33 moles) was added with stirring via dropping funnel at such a rate as to maintain the internal temperature below 40° C., preferably around 30° C. (note that the reaction is exothermic). Once addition was complete the reaction mixture was allowed to stir for 4 hours. After this time TLC and HPLC indicated that the reaction had gone to completion. Once at room temperature, the mixture was quenched by the addition of saturated NaCl solution with stirring (1 L).

The organic layer was separated and aqueous layer extracted with t-butyl methyl ether (3×300 ml). Combined organic layers were washed twice with saturated $NaHCO_3$ (2×500 ml) followed by water (2×200 ml) then with brine (500 ml). The ether layer was dried over anhydrous $MgSO_4$ and solvent removed under atmospheric pressure. The distillation apparatus was connected to a vacuum pump (water pump) and the bromide was distilled at 40-60 degrees at pressure of about 25 mmHg to afford a pale yellow oil (318 g, 80% yield).

1.2 Preparation of Tertiary Amine (3)

A multi neck flung flask (2 L), fitted wish a mechanical stirrer, condenser, thermometer and dropping funnel, and placed in a cooling bath (ice-water) was charged with acetone (500 ml), concentrated aqueous ammonia solution (30 ml) and anhydrous potassium carbonate (159 g, 1.15 mole). The mixture was stirred at room temperature for 30 minutes. Allyl bromide (52.5 g, 0.35 mole) was added via a dropping funnel at such a rate that the internal reaction is maintained below 25 degrees for 20 minutes. The reaction was stirred at room temperature for 3 hours after which time TLC (silica, 5% methanol in DCM) indicated reaction completion. The solid suspension was filtered off and washed with acetone (2×50 ml). The solvent was evaporated under reduced pressure and the tertiary amine 3 was obtained as a pale yellow which solidified on standing (28 g, 107% crude).

1.3 Preparation of Secondary Amine (4)

Crude tertiary amine (9 g, 41 mmol) was placed in a 25 ml round bottomed (RB) flask fitted with a condenser. The contents of the flask were heated in a DrySyn® (an aluminium block) placed on a stirrer hot plate to 200° C. (external temperature) over 30 minutes. Solid material started to melt at around 140-150° C. The material was heated at 200° C. for 2.5 hours. The progress of the reaction was monitored by TLC (silica, 10% methanol in DCM with 5 drops of methanolic ammonia solution). After this time the reaction mixture was allowed to cool to room temperature.

1.4 Preparation of Hexanoic Acid (bis(3-methylbut-2-enyl)amide

The cool reaction mixture from the previous step was transferred to a 100 ml RB flask containing potassium carbonate (6 g, 43 mmole) with 30 ml acetone. This was stirred at room temperature and hexanoyl chloride (3.8 g, 3 ml, 28 mmole) was added dropwise via a dropping funnel over 10 minutes with stirring. The reaction mixture was allowed to stir at room temperature overnight, and the next day TLC (silica plates, 2.5% methanol in DCM) indicated the formation of the target monomer 1. The solvent was removed under reduced pressure and solids were washed with 30 ml of petroleum ether (40-60) and filtered. Decolorising charcoal (1 g) was added to the filtrate and heated to boil and then filtered hot. Solvent was removed under reduced pressure to afford a pale brown oil (5.0 g, 49% yield). HPLC indicated a purity of 94%.

EXAMPLE 2

Polymerisation of Hexanoic Acid (bis(3-methylbut-2-enyl)amide (1)

Hexanoic acid (bis(3-methylbut-2-enyl)amide 1 polymerised easily under UV radiation (mercury discharge UV emitter) using ca 1.5% by weight of IRGACURE 184 photoinitiator. Exposure times as little as 1 second were sufficient to effect polymerisation. The polymer produced thereby was extremely resistant to solvents.

EXAMPLE 3

Polymerisation of Hexanoic Acid (bis(3-methylbut-2-enyl)amide (1) without Photoinitator Hexanoic acid (bis(3-methylbut-2-enyl)amide 1 polymerised under UV radiation (mercury discharge UV emitter) without employing a photoinitiator. Cure was effected in as little as 1 second. Polymerisation was equally facile in a further experiment using LED UV light sources operating at 390 nm to cure the monomer in the absence of photoinitiator.

EXAMPLE 4

The target molecule 5 (hexanoic acid (3-methylbut-2-enyl) amide) is shown below

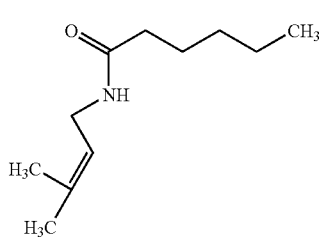

and the synthetic scheme is shown in FIG. 2.

4.1 Synthesis of 1-bromo-3-methylbut-2-ene (6)

3-methyl-buten-3-ol (97%, 500 ml) was added to hydrobromic acid (48%, 1 L) at room temperature with constant stirring for 2 hours. The mixture was then left to stand for another 2 hours, after which the top transparent yellow layer was decanted away from the aqueous/HBr bottom layer. The top layer was dried thoroughly over $CaSO_4$ and then distilled at 63° C. to produce a colourless liquid of density 1.26 g/ml.

4.2 Preparation of Primary Amine (7)

The bromo methyl butane 6 was dissolved in acetone (50 ml) and this solution added dropwise, with stirring, to a pre-cooled solution to −5° C. of concentrated aqueous ammonium hydroxide (25 ml) in the presence of potassium carbonate (22 g). The mixture was stirred at this temperature for 30 minutes after which time it was allowed to come to room temperature. The solvent and primary amine 7 were removed in-vacuo.

4.3 Preparation of Hexanoic Acid (3-methylbut-2-enyl)amide (5)

Hexanoyl chloride (3.8 g) was added dropwise to the secondary amine and acetone, with stirring, over 30 minutes at room temperature. The reaction was allowed to stir for four hours after which time the solvent was removed in-vacuo to leave a yellow oil, which was purified by silica gel flash column chromatography using dichloromethane as eluent. The target monomer 5 is a pale yellow oil.

EXAMPLE 5

Polymerisation of Hexanoic Acid (3-methyl but-2-enyl)amide (5)

The monomer 5 polymerised under UV radiation using the conditions described in Example 2.

EXAMPLE 6

Polymerisation of Hexanoic Acid (3-methylbut-2-enyl)amide (5) with a Cross-linker Monomer 5 was produced in accordance with Example 4, and was copolymerised with a cross-linker compound

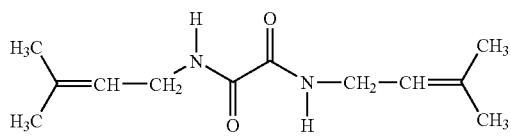

The cross-linker compound was prepared using the methodology described in Example 4, with the exception that the hexanoyl chloride used in step 4.3 was replaced with oxaloyl chloride (ClOOCCOOCl) in a molar ratio of 2:1 (primary amine 7:oxaloyl chloride). The cross-linker (5%) was dissolved in monomer 5 (95%) at room temperature, and the resultant solution copolymerised easily using polymerisation conditions as described in Example 2.

The invention claimed is:

1. A method of producing a polymeric material, said method including the step of subjecting a starting material which includes a group of sub-formula (XIII)

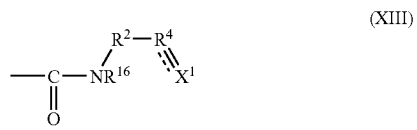

where $R^{16}$ is selected from hydrogen, halo, nitro, hydrocarbyl, optionally substituted or interposed with functional groups, or

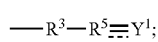

$R^2$ and $R^3$ are independently selected from $(CR^6R^7)_n$ or a group $CR^8R^9$, $CR^6R^7CR^8R^9$ or $CR^8R^9CR^6R^7$ where n is 0, 1 or 2, $R^6$ and $R^7$ are independently selected from hydrogen or alkyl, and either one of $R^8$ or $R^9$ is hydrogen and the other is an electron withdrawing group, or $R^8$ or $R^9$ together form an electron withdrawing group; and $R^4$ and $R^5$ are independently selected from CH or $CR^{10}$ where $CR^{10}$ is an electron withdrawing group, the dotted lines indicate the presence or absence of a bond, $X^1$ is a group where $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$ and $X^3$, and, if present, $Y^2$ and $Y^3$, are each a $C_1$ to $C_4$ alkyl group;

to conditions under which polymerisation of the starting material occurs.

2. A method according to claim 1 in which $X^2$, $X^3$, $Y^2$ and $Y^3$ are each either methyl or ethyl.

3. A method according to claim 2 in which $X^2$, $X^3$, $Y^2$ and $Y^3$ are each methyl.

4. A method according to claim 1 in which the group of sub-formula (XIII) includes the group

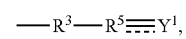

the polymerisation of the starting material is a cyclopolymerisation reaction, and at least one of (a) $R^2$ and $R^3$ or (b) $R^4$ and $R^5$ includes an electron withdrawing group which is able to activate a cyclopolymerisation reaction.

5. A method according to claim 1 in which the polymerisation of the starting material is effected by the application of radiation, where necessary in the presence of an initiator but preferably without an initiator present.

6. A method according to claim 5 wherein the polymerisation is effected by the application of ultraviolet radiation.

7. A method according to claim 1 where, in the group of sub-formula (XIII), $X^1$ and, where present, $Y^1$ represents $CX^2X^3$ and $CY^2Y^3$ respectively, and the dotted bonds are absent.

8. A method according to claim 1 wherein the starting material is a compound of structure (XIV)

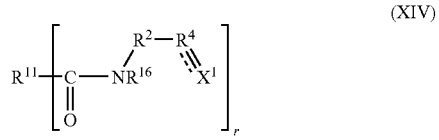

where $R^2$, $R^4$, $R^{16}$, and the dotted bonds are as defined in claim 1, r is an integer of 1 or more, and $R^{11}$ is a bridging group, an optionally substituted hydrocarbyl group, a perhaloalkyl group, a siloxane group or an amide, of valency r.

9. A method according to claim 8 wherein the starting material comprises a compound of formula (XV)

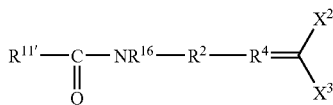

where the group

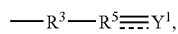

if present, is of the form

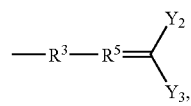

and where $X^2$, $X^3$, $Y^2$, $Y^3$, $R^2$, $R^3$, $R^4$, $R^5$, and $R^{16}$ are as defined in claim 1, and $R^{11'}$ is an optionally substituted hydrocarbyl group, a perhaloalkyl group, a siloxane group or an amide.

10. A method according to claim 8 in which $R^{11}$ comprises a straight or branched chain hydrocarbyl group, optionally substituted or interposed with functional groups.

11. A method according to claim 10 in which $R^{11}$ is an optionally substituted hydrocarbyl group having four or more carbon atoms.

12. A method according to claim 11 in which $R^{11}$ is a straight or branched chain alkyl group having four or more carbon atoms.

13. A method according to claim 9 wherein the compound of formula (XV) is a compound of formula (IV)

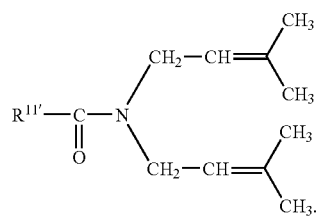

14. A method according to claim 13 in which the compound of formula (IV) is a compound of formula (V)

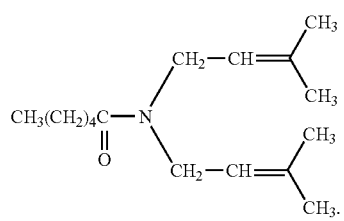

15. A method according to claim 1 in which the starting material does not include the group

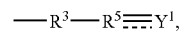

16. A method according to claim 15 wherein the compound of formula (XV) is a compound of formula (VI)

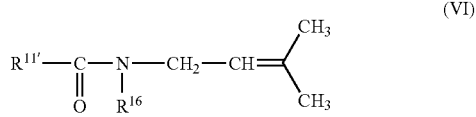

where $R^{16}$ is selected from hydrogen, halo, nitro or hydrocarbyl, optionally substituted or interposed with functional groups, only.

17. A method according to claim 16 in which the compound of formula (VI) is a compound of formula (VII)

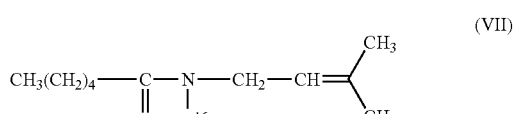

18. A method according to claim 1 wherein the step of polymerising the starting material produces a copolymer, the starting material being mixed with different monomeric units.

19. A method according to claim 18 in which the starting material is reacted with a compound of formula XVI

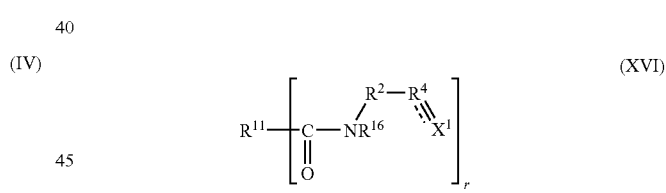

where $R^2$, $R^4$, $R^{11}$, $R^{16}$ and $X^1$ are as defined in relation to sub-formula (XII).

20. A method according to claim 19 in which r is 2.

21. A method according to claim 20 in which the compound of formula XVI is a compound of formula (IX)

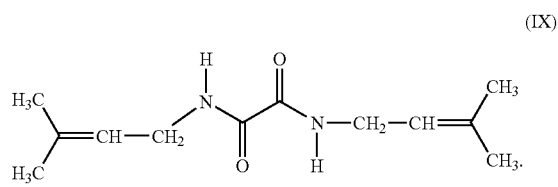

22. A polymer obtained by a method according to claim 1.

23. A polymer according to claim 22 of sub-formula (XVII)

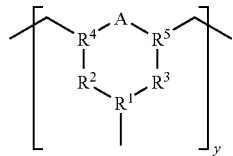
(XVII)

where A is a bond or $CY^2Y^3$, $R^1$, $R^2$, $R^3$, $R^4$, $R^5$, $CX^2X^3$ and $CY^2Y^3$ are as defined in relation to the group of sub-formula (XIII), and y is arm integer in excess of 1, preferably in excess of 5.

24. A monomeric compound which includes a group of sub-formula (XIII) as defined in claim 1.

25. A method of preparing a monomeric compound according to claim 24 including the step of reacting a compound having a group of sub-formula (XI)

(XI)

with a compound having a group of sub-formula (XII)

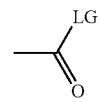
(XII)

where $X^2$, $Y^1$, $R^2$, $R^4$, and $R^{16}$ are as defined in relation to sub-formula (XIII), and LG is a leaving group.

26. A method according to claim 25 in which LG is halo, preferably chloro.

* * * * *

UNITED STATES PATENT AND TRADEMARK OFFICE
CERTIFICATE OF CORRECTION

PATENT NO. : 7,750,062 B2  Page 1 of 1
APPLICATION NO. : 12/342282
DATED : July 6, 2010
INVENTOR(S) : Rolfe et al.

It is certified that error appears in the above-identified patent and that said Letters Patent is hereby corrected as shown below:

Claim 23, column 17, line 15, please replace "arm" with -- an --.

Signed and Sealed this

Sixteenth Day of November, 2010

David J. Kappos
*Director of the United States Patent and Trademark Office*